United States Patent [19]

Bleckmann et al.

[11] Patent Number: 5,274,326
[45] Date of Patent: Dec. 28, 1993

[54] CIRCUIT CONFIGURATION FOR PROCESSING THE OUTPUT SIGNALS OF A SPEED SENSOR TO ELIMINATE NOISE

[76] Inventors: Hans-Wilhelm Bleckmann, Fröbestrasse 2, 6350 Bad Nauheim 3; Heinz Loreck, Rosenweg 16, 6270 Idstein 2; Michael Zydek, Kurmainzer Strasse 40, 6230 Franfurth am Main; Wolfgang Fey, Raugrafenstrasse 8, 6501 Worrstadt, all of Fed. Rep. of Germany

[21] Appl. No.: 855,687
[22] PCT Filed: Oct. 18, 1990
[86] PCT No.: PCT/EP90/01761
  § 371 Date: May 6, 1992
  § 102(e) Date: May 6, 1992
[87] PCT Pub. No.: WO91/06457
  PCT Pub. Date: May 16, 1991

[30] Foreign Application Priority Data

Nov. 6, 1989 [DE] Fed. Rep. of Germany ....... 3936831

[51] Int. Cl.⁵ .................. G01P 3/489; G01P 3/56
[52] U.S. Cl. ............................ 324/166; 307/106; 307/120; 324/161
[58] Field of Search ............... 324/160, 161, 163, 166, 324/173, 174, 175; 307/106, 108, 120

[56] References Cited

U.S. PATENT DOCUMENTS

| 3,840,277 | 10/1974 | Bouthers | 303/21 P |
| 4,429,234 | 1/1984 | Streit | |
| 4,532,437 | 7/1985 | Bodig | |
| 4,546,437 | 10/1985 | Bleckmann et al. | |
| 4,764,685 | 8/1988 | Bleckmann et al. | 324/161 X |
| 4,785,238 | 11/1988 | Braschel et al. | 324/173 |
| 4,837,508 | 6/1989 | Garnault | 324/166 |
| 4,894,613 | 1/1990 | Tsugawa | 324/166 X |
| 4,902,970 | 2/1990 | Suquet | 324/173 |
| 4,905,507 | 3/1990 | Klein et al. | 73/118.1 |
| 4,914,387 | 4/1990 | Santos | 324/174 X |
| 5,144,231 | 9/1992 | Tenenbaum et al. | 324/166 X |

FOREIGN PATENT DOCUMENTS

| 0140861 | 5/1985 | European Pat. Off. |
| 0214921 | 3/1987 | European Pat. Off. |
| 0348643 | 5/1989 | European Pat. Off. |
| 2235056 | 8/1973 | Fed. Rep. of Germany |
| 3234637 | 3/1984 | Fed. Rep. of Germany |
| 3300931 | 7/1984 | Fed. Rep. of Germany |
| 3541853 | 6/1987 | Fed. Rep. of Germany |
| 3543058 | 6/1987 | Fed. Rep. of Germany |
| 3702474 | 8/1987 | Fed. Rep. of Germany |
| 3701467 | 7/1988 | Fed. Rep. of Germany |
| 3714271 | 11/1988 | Fed. Rep. of Germany |
| 3742244 | 4/1989 | Fed. Rep. of Germany |
| 3809886 | 10/1989 | Fed. Rep. of Germany |
| 84/00452 | 2/1984 | World Int. Prop. O. |

Primary Examiner—Gerard R. Strecker
Assistant Examiner—Warren S. Edmonds
Attorney, Agent, or Firm—Robert P. Seitter; J. Gordon Lewis

[57] ABSTRACT

A circuit configuration for editing, or processing the output signal of a speed sensor (5) includes a trigger circuit (1, 22), the changeover points or "hysteresis" of which are controllable, with the circuit configuration being furnished with circuits for determining the coupling factor (k), and with circuits for adjusting the hysteresis in response to the coupling factor. The coupling factor (k)—multiplied by the frequency of the sensor signal corresponding to the speed—forms the amplitude of the sensor output signal. With the coupling factor (k) being high, the hysteresis will be high, while it will be low with a low coupling factor.

8 Claims, 2 Drawing Sheets

CIRCUIT CONFIGURATION FOR PROCESSING THE OUTPUT SIGNALS OF A SPEED SENSOR TO ELIMINATE NOISE

FIELD OF THE INVENTION

The present invention is concerned with a circuit configuration for editing, or processing the output signal of a speed sensor, the frequency of which is evaluated for determining the speed, with the amplitude being equally dependent on the speed. Speed sensors of this type are needed, for example, in anti-locking control systems (ALC) or in traction slip control systems (TSC).

BACKGROUND OF THE INVENTION

DE-OS German 32 34 637 teaches a circuit configuration of the afore-described type, by which the sensor signals are edited for an electronic anti-locking system. The information on the wheel rotating pattern required for the control is obtained with the aid of sensor signals. For this purpose, a toothed disc rotates along with the wheel, with the disc cooperating with a stationary inductive transducer. The output signal of the inductive transducer is available in the form of an a.c. voltage which in frequency and amplitude is proportional to the wheel speed. With the aid of a trigger circuit, the sensor signals are edited, i.e. boosted and converted into a square wave signal or a pulse sequence, the frequency of which corresponds to the speed. The trigger circuit, in addition, contains filters to attenuate noise signals to the extent possible.

The heavy dependence of the amplitude on the speed results in that, at low wheel speeds, the output signals will become so weak that they can only be distinguished from the inevitable noise signals by taking additional steps. Moreover, because the voltage induced in the transducer is greatly dependent on the air gap between the transducer and the toothed disc and, hence, on the operating tolerances, eccentricities of the wheel or the positioning of the wheel, the output signal, for identical wheel speeds, can assume highly different amplitudes. In adverse circumstances, i.e. at a low speed and a large air gap, the output signal may become extremely weak. This also applies if, through costly correcting and adjusting efforts, the mechanical tolerances are kept low.

Another process and circuit configuration for editing the sensor output signals have been described in DE-OS German 35 43 058, which is concerned with an enhanced separation of noise signal and useful signal. For that purpose, two low-pass filters are provided between the sensor output and the trigger circuit, which generate a useful signal on the one hand, and a reference signal on the other hand. The two signals are compared. In response to the difference of the two signals, with the aid of a comparator, a pulse-shaped output signal, viz. the edited sensor signal, is generated. The reference signal, with the aid of a control signal obtained through a matching circuit, dynamically follows the useful signal.

The strong dependence of the amplitude of the output signal of the sensor on the speed and on the air gap between the transducer and the toothed disc does, however, still renders difficult the layout of a trigger circuit of this type. The response threshold, under consideration of the largest air gap permitted in the tolerance range, and under consideration of the lowest speed to which the controller responds, will have to be rather low, such as 100 mV, so that the trigger circuit in such an extreme case will reliably respond. In the event of an air gap which is small by accident or by the tolerance conditions, and a resultant relatively strong noise signal, there will, however, be danger for the trigger threshold to be reached also by the noise signal. The prior known grinding of the tires along the road causing so called "frictional vibrations", the dynamic changes in the air gap as a result of roadway shocks and numerous other causes create noise signal levels exceeding the response threshold designed for the lower limit range.

SUMMARY OF THE INVENTION

The problem underlying the invention, therefore, resides in overcoming the disadvantages described and in providing a circuit configuration which, on the one hand, sensitively responds to useful signals and nevertheless does not respond to noise signals of the type described that occur in practice.

This problem can be solved by a circuit configuration of the afore-mentioned type which substantially comprises a sweep circuit or trigger circuit, the switch-over points or "hysteresis" of which are controllable. Also included are circuits for determining a coupling factor which, multiplied by the frequency of the sensor signal corresponding to the speed, is the amplitude of the output signal of the sensor. Further included are circuits for adjusting the hysteresis of the trigger circuit in response to the coupling factor.

Because of the automatic computation of the coupling coefficient and the corresponding adjustment of the hysteresis, the trigger threshold will be high, for example, for an accidentally small air gap resulting both in high useful signals and in relatively high noise signals at the output of the sensor. Conversely, in the event of a large air gap weakening both the useful signals and the noise signals, the response threshold of the trigger is low. Hence, the inevitable tolerances of assembly of the sensor are offset by adaptation of the trigger circuit and the hysteresis of the trigger circuit, respectively. As the coupling factor, in one example may fluctuate at a ratio of 1:20 (i.e. between 3 and 60 mV/Hz), the adaptation is extremely important to the suppression of noise signal effects. The signal-to-noise ratio may be raised by almost the same factor.

The adaptation of the hysteresis to the coefficient of coupling as suggested by the invention results in savings in the sensor and the assembly thereof. Compared to traditional solutions, enhanced assembly tolerances are achieved. Less strict requirements are placed upon the signal transmission between the sensor and the electronic unit, because of the lower effect of noise signals. Avoidance of or substantial reduction in trigger errors will result in an enhanced control quality of the anti-locking or traction slip control system.

According to a preferred embodiment of the invention, the hysteresis of the trigger circuit is adjusted to the amplitude of the signal Which prevails at the output of the sensor at the lowest speed to be determined.

Moreover, the circuit configuration may be so designed that the hysteresis, with an increasing speed or frequency, rises continuously or by increments. The dependence can be so selected that the ratio between the permitted noise level and the useful signal, throughout the speed range, remains approximately constant.

In another preferred embodiment of the invention, the influence of the coupling factor on the hysteresis rise is weighted or varied in response to the rising frequency of the sensor signal and to the speed of an automotive vehicle, based upon the occurrence of a predetermined regularly recurring event, such as actuation of the ignition. At a relatively low speed, the probability that the coupling factor was properly identified is lower than at a higher speed, so that the circuit configuration, feasibly, is so designed that the influence of the coupling factor on the hysteresis rise increases with a rising speed and frequency, respectively, of the output signal of the sensor continuously or in several steps. In case of a decrease in the speed of the automotive vehicle the stronger influence on the hysteresis speed is maintained. It is only after the next ignition actuation that the influence of the coupling factor on the hysteresis rise is again increased stepwise or continuously.

Further features, advantages and applications of the invention will become apparent from the following illustration with reference to the drawings.

DETAILED DESCRIPTION OF THE INVENTION

Figure 1:
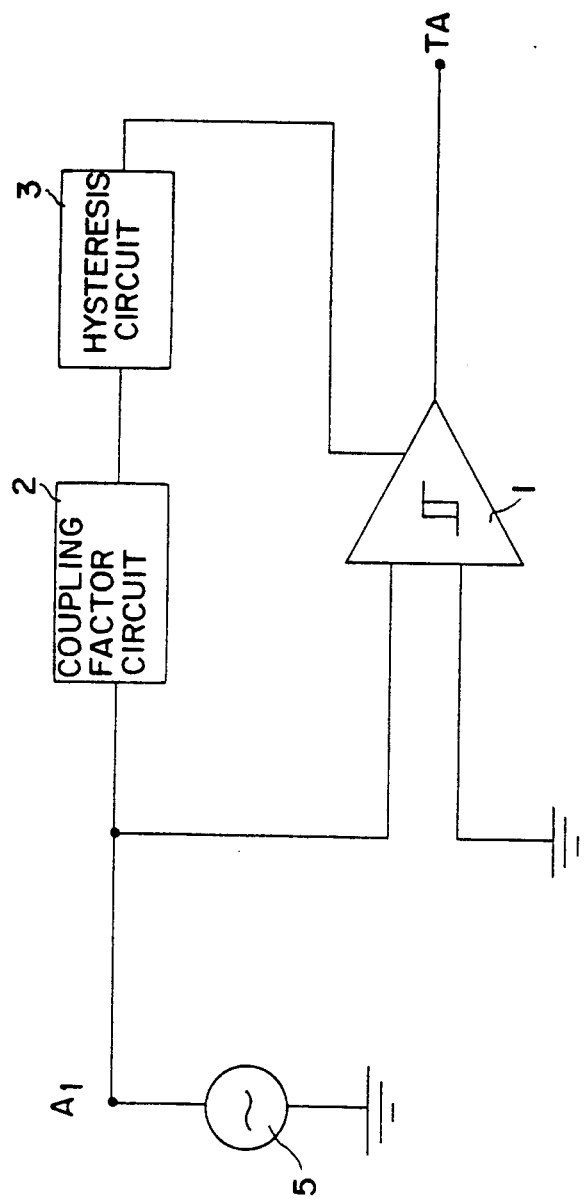
FIG. 1 is a schematic drawing of a circuit configuration according to the invention.

According to FIG. 1, the circuit configuration of the invention, basically, consists of a sweep circuit or trigger circuit 1 of a variable controllable hysteresis, a circuit 2 for computing the coupling factor k, and another circuit 3 for computing the hysteresis and the change-over contacts of the trigger circuit 1 in response to the determined actual coupling factor k, and for generating a signal determining the operating point and the hysteresis of the trigger circuit 1. The output signal of a wheel sensor 5 will be edited with the aid of this circuit configuration. A rectangular-wave signal or a pulse sequence, the frequency or pulse ratio of which is a measurement for the speed, will be derived from this sensor signal. The frequency and amplitude of the rectangular-wave signal are dependent on the wheel speed, and the rectangular-wave signal is made available at the output TA of the circuit. The signal on output TA is substantially cleared from noise or misinformation and can be reprocessed, for example, in the electronic controller of an anti-locking control system (not shown). Thus, this rectangular-wave signal at output TA is an edited version of the output signal from a speed sensor, and serves as a control signal to be inputted to an anti-locking control system.

Figure 2:
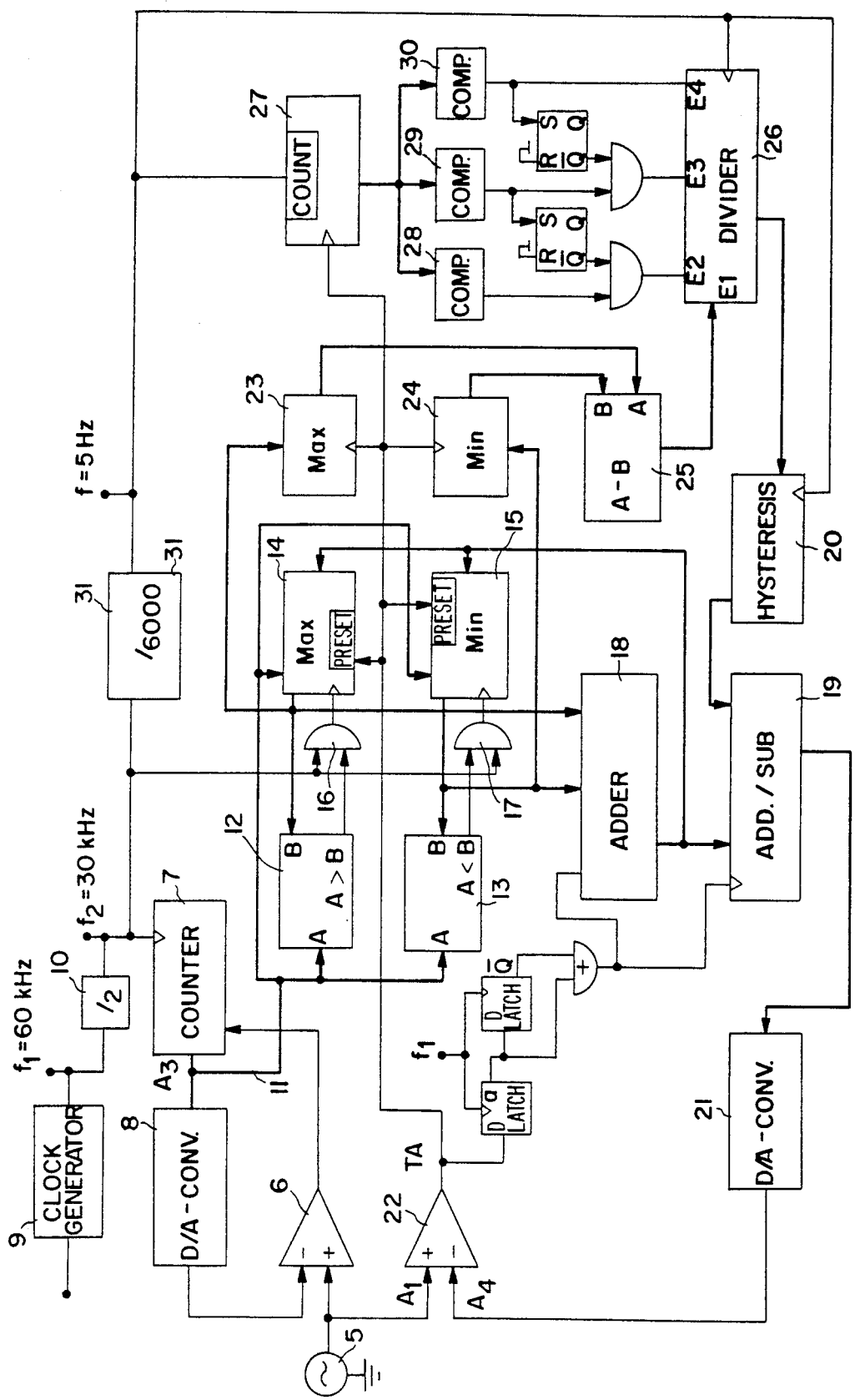
FIG. 2 is a block diagram of an embodiment of the circuit configuration according to FIG. 1.

FIG. 2 shows an embodiment of the invention according to FIG. 1.

The signal of the wheel sensor available on output $A_1$ of the wheel sensor 5, with the aid of a comparator 6, a forward/backward counter (or up/down counter) 7 and a digital-to-analog converter 8, is first converted into a digital electronically reprocessed signal. Depending on the condition of the output signal (high or low) of the comparator 6 which, in turn, is determined by the difference of the two input signals of the comparator, the counter 7 counts either forward or backward. The working cycle for this counter and for the other components of the circuit shown in FIG. 2 is provided by a clock generator 9, the frequency of which can be scaled down by a divider 10, should this be required. In one embodiment of the invention, the clock generator frequency was 60 kHz and, by stage 10 was reduced to 30 kHz. The count at the output $A_3$ after conversion into an analog signal by digital-to-analog converter 8 is compared to the sensor output signal $A_1$.

Moreover, count $A_3$, through a multiple line 11, e.g. an 8-bit data line, is communicated to comparators 12, 13 to be compared therein, on the one hand, with the stored maximum value (in comparator 12) and, on the other hand, with the stored minimum value (in comparator 13) of the count. Such maximum and minimum values, respectively, are formed in memories 14, 15 the inputs of which, equally are in communication with the data line 11. Through an AND-gate 16 also in communication with the operation cycle and synchronizing the work sequence, the memory contents of the maximum memory 14 are increased if count A on the input of the comparator 12 exceeds the stored maximum value communicated to the second input B of the comparator 12. The memory contents of the minimum memory 15 are correspondingly adjusted if the value on the input A of the comparator 13 is less than the stored minimum value communicated to the second input B of the comparator 12.

The output signals of the maximum and of the minimum memories 14 and 15, respectively, are supplied to an adder 18 to determine the average value of the output signal of the sensor. The output of the adder 18 leads to an add-substract circuit 19 adding to or subtracting from the average value a value representing the computed "hysteresis" so that, eventually, the value of the output of this circuit 19, dependent on the average value and the computed hysteresis, after conversion into a corresponding analog value with the aid of a digital-to-analog converter 21, will fix the operating point of a trigger circuit 22 corresponding to the trigger circuit 1 according to FIG. 1. The output signal of the adder 18 representing the average value, moreover, will be returned to the memories 14, 15. The second input signal of the trigger circuit 22 is the output signal $A_1$ of the sensor 5. The level at the input A of the trigger circuit 22, precisely speaking, does not form the point of operation (the work point) but rather the point of operation±hysteresis. Available at the output TA of the trigger circuit 22 is the edited signal of the wheel sensor 5. It is a rectangular-wave signal which, optionally, can be converted into a pulse sequence.

Moreover, the maximum and minimum counts, in each positive flank of the output signal TA of the trigger circuit 22, are stored in the memory circuits 23, 24. The amplitude of the sensor signal can then be determined with the aid of a differential generator 25. In each positive flank of the correction signal TA, in addition, the maximum count in memory 14 is reduced to the average value.

In each negative flank, the minimum count in memory 15 is restored to the average value. This will be needed to detect the actual amplitude and the average value.

This amplitude of the sensor signal in response to the speed and the frequency, respectively, corresponding to the said speed enables the computation of the coupling factor, k, according to the formula $$k = U_{sensor}/f$$

where $U_{sensor}$ is the amplitude of the sensor signal and f is the measuring frequency at a tooth number of the sensor wheel (not shown) of about 50, being approximately between 30 and 2000 Hz, this relating to a wheel sensor for an anti-locking system for use with automotive vehicles.

In the practice of the invention, the hysteresis and the switchover points of the trigger circuit 22 (and 1 in FIG. 1, respectively) are fixed in response to the coupling factor.

The sensor amplitude determined in the differential generator 25, with the aid of a divider circuit 26, is related to and weighted with the wheel speed or the frequency corresponding to the wheel speed. The output signal of this divider circuit is stored in a memory 20 and—as previous described—is reprocessed in circuits 19 and 21 for work point determination (work point-±hysteresis). For weighting the amplitude determined by circuit 25 and for determining the amount to be contributed by the amplitude for correcting the hysteresis, the speed and the signal frequency, respectively, attained in the meanwhile, are signalled to the divider circuit 26 through a counter 27 and a plurality of comparators 28 to 30. The counter 27, through a divider 31 reducing the frequency of the cycle at the output of circuit 10 to 5 Hz, is activated for half a cycle (10 ms). During that time, the counter 27 according to FIG. 2 counts the positive flanks of the trigger output signal TA. The output signal of the counter 27, after completion of the counting process, hence, is a measurement for the sensor frequency.

Once a lower speed threshold is reached, for example, in the start-up of an automotive vehicle, which, according to FIG. 2, corresponds to a signal of 40 Hz., the first comparator 28 will supply to the divider circuit 26 a corresponding signal. At this comparatively low vehicle speed, measurement of the coupling factor k is considered to be relatively unreliable. The influence of the instantaneously measured coupling factor and of the corresponding amplitude, respectively, on the correction of the hysteresis is, therefore, maintained relatively low. Thus, when the input E2 is applied by comparator 28 (which only operates at low vehicle speed), the influence of the coupling factor on the hysteresis is relatively low.

Reaching a higher speed results e.g. in a signal of 60 Hz. This will be signalled by the comparator 29 through the flip-flop and the OR-gate as shown, in a blocking of the signal provided by the comparator 28 and in the actuation of the input E3 of the divider circuit 26. The coupling factor k measured at the elevated speed is "safer" and its influence on the hysteresis correction, consequently, higher than at the previously described lower speed resulting in a signal at the input E2. The comparator 30, at a still higher speed (120 Hz), generates the input signal E4. The coupling factor measured at that speed is weighted highest.

Once a higher speed is attained, the hysteresis adjusted by the higher weighting, will be maintained even slower vehicle speed. A switch-back to the stage of lowest weighting will be made dependent on predetermined events, for example, on the actuation of the ignition. The described way of weighting and restoring during switch-off of the ignition is, of course, only one alternative among a number of capabilities.

The circuit configuration according to the present invention is substantially less sensitive to noise signals because the sweep points and the hysteresis, respectively, of the trigger circuit no longer are required to be adjusted to the most unfavorable case—e.g. to the largest air gap between sensor and toothed disc. The hysteresis, automatically, is raised and the response sensitivity is lowered, respectively, to such an extent as is permitted by the actual coupling factor. Once the coupling factor is high, both the useful signals and the (induced) noise signals are relatively high. However, through raising the hysteresis, the response to such noise signals is precluded. If, conversely, the coupling factor is low, the useful signals will become weak; the response sensitivity of the trigger will become high. However, there will be no risk of mistriggering because the low coupling factor will also weaken the noise signals. Hence, the technical advance attained is substantial.

What is claimed is:

1. A circuit configuration for processing output signals of a speed sensor of an automotive vehicle wheel to eliminate noise from said output signals, said circuit configuration comprising:

first circuit means, responsive to:
(a) output signals of a speed sensor of an automotive vehicle wheel, and
(b) previously processed output signals of said speed sensor, for developing:
(a) average value signals representative of the average speed of said automotive vehicle wheel, and
(b) coupling factor signals representative of a coupling factor which is the amplitude of said output signals divided by the frequency of said output signals;

second circuit means, responsive to:
(a) said average value signals, and p1 (b) said coupling factor signals, for generating control signals representative of the average speed of said automotive vehicle wheel and said coupling factor; and means responsive to said output signals of said speed sensor and said control signals for modifying said output signals by said control signals to develop said processed output signals.

2. A circuit configuration in accordance with claim 1 wherein said first circuit means includes means for:
(a) establishing a plurality of predetermined frequency ranges,
(b) determining which of said frequency ranges the frequency of said output signals fall into, and
(c) weighting the influence of said coupling factor signals on said control signals based on which of said frequency ranges the frequency of said output signals fall into.

3. A circuit configuration in accordance with claim 2, wherein said means for weighting the influence of said coupling factor signals on said control signals include means for increasing the influence of said coupling factor with increasing frequency of said output signals.

4. A circuit configuration in accordance with claim 3, wherein said means for increasing the influence of said coupling factor with increasing frequency of said output signals remain active until actuation of a regularly recurring event.

5. A circuit configuration in accordance with claim 4, wherein said regularly recurring event is actuation of an ignition.

6. A circuit configuration in accordance with claim 1, wherein:
said output signals include a signal representative of a predetermined lowest speed having a corresponding amplitude and
said circuit configuration further includes means for adjusting said coupling factor signals to said amplitude corresponding to said signal representative of said predetermined lowest speed.

7. A circuit configuration for processing output signals of a speed sensor of an automotive vehicle wheel to eliminate noise from said output signals, said circuit configuration comprising:

first circuit means, responsive to:
  (a) output signals of a speed sensor of an automotive vehicle wheel, and
  (b) previously processed output signals of said speed sensor,
for developing:
  (a) average value signals representative of the average speed of said automotive vehicle wheel, and
  (b) coupling factor signals representative of a coupling factor which is the amplitude of said output signals divided by the frequency of said output signals;

second circuit means, responsive to said coupling factor signals, for developing hysteresis signals representative of a hysteresis which is increasingly weighted by said coupling factor with increasing frequency of said output signals;

third circuit means, responsive to:
  (a) said average value signals, and
  (b) said hysteresis signals,
for generating control signals representative of the average speed of said automotive vehicle wheel and said hysteresis; and means responsive to said output signals of said speed sensor and said control signals for developing said processed output signals.

8. A circuit configuration in accordance with claim 7, wherein:

said output signals include a signal representative of a predetermined lowest speed having a corresponding amplitude and said circuit configuration further includes means for adjusting said hysteresis signals to said amplitude corresponding to said signal representative of said predetermined lowest speed.

* * * * *

UNITED STATES PATENT AND TRADEMARK OFFICE
CERTIFICATE OF CORRECTION

PATENT NO. : 5,274,326
DATED : December 28, 1993
INVENTOR(S) : Hans-Wilhelm Bleckmann et al It is certified that error appears in the above-indentified patent and that said Letters Patent is hereby corrected as shown below:

Column 6, Claim 1, line 30, delete "p1" and begin a new line with "(b) said coupling factor signals,"

Signed and Sealed this

Second Day of August, 1994

*Attest:*

BRUCE LEHMAN

*Attesting Officer*     *Commissioner of Patents and Trademarks*